(12) United States Patent
Rushing (10) Patent No.: US 12,037,472 B2
(45) Date of Patent: Jul. 16, 2024

(54) ANAEROBIC COMPOSITE MATRIX RESINS

(71) Applicant: Texas Research International, Inc., Austin, TX (US)

(72) Inventor: Rock Rushing, Spicewood, TX (US)

(73) Assignee: TEXAS RESEARCH INTERNATIONAL, INC., Austin, TX (US)

( * ) Notice: Subject to any disclaimer, the term of this patent is extended or adjusted under 35 U.S.C. 154(b) by 394 days.

(21) Appl. No.: 17/409,185

(22) Filed: Aug. 23, 2021

(65) Prior Publication Data

US 2021/0395473 A1 Dec. 23, 2021

Related U.S. Application Data

(60) Division of application No. 16/173,570, filed on Oct. 29, 2018, now abandoned, which is a
(Continued)

(51) Int. Cl.
*C08J 5/06* (2006.01)
*C08J 5/04* (2006.01)
(Continued)

(52) U.S. Cl.
CPC ............. *C08J 5/06* (2013.01); *C08J 5/042* (2013.01); *C08J 5/10* (2013.01); *C08J 5/243* (2021.05); *C08J 5/248* (2021.05); *C08J 5/249* (2021.05); *C08K 5/14* (2013.01); *C08K 5/18* (2013.01); *C08K 5/43* (2013.01); *C08L 63/10* (2013.01); *B29C 73/02* (2013.01); *C08J 2363/10* (2013.01); *C08K 5/0025* (2013.01);
(Continued)

(58) Field of Classification Search
CPC .... C08K 5/14; C08K 5/18; C08K 5/43; C08L 33/10; C08L 33/08
See application file for complete search history.

(56) References Cited

U.S. PATENT DOCUMENTS

3,489,599 A * 1/1970 Krieble ................. C09J 5/00
427/247
3,547,851 A * 12/1970 Elliott ................. C08F 299/024
524/400
(Continued)

*Primary Examiner* — Peter A Salamon
(74) *Attorney, Agent, or Firm* — Jackson Walker LLP (57) ABSTRACT

A matrix resin composition for fiber reinforced composite materials is described. The resin is thermosetting and achieves a glass transition temperature of at least 177° C. (Tg), obtained by curing under anaerobic conditions at room temperature. The matrix resin will streamline composite fabrication processes by eliminating the need for heating during the cure process. The implications of this development are significant in terms of the ease of use and elimination of procedural steps. While the resin system was developed specifically for vacuum bagging, it is expected to be viable for other composite fabrication methods including resin transfer molding (RTM) and vacuum-assisted resin transfer molding (VARTM). The resin system is viable for use with carbon fiber reinforcements to fabricate laminates at least 0.20 inches thick. The resulting laminates have low porosity and mechanical properties equivalent to those prepared with common epoxy matrix resins.

10 Claims, 7 Drawing Sheets

Related U.S. Application Data continuation-in-part of application No. 16/157,386, filed on Oct. 11, 2018, now Pat. No. 11,084,913.

(60) Provisional application No. 62/571,349, filed on Oct. 12, 2017.

(51) Int. Cl.
| | |
|---|---|
| *C08J 5/10* | (2006.01) |
| *C08J 5/24* | (2006.01) |
| *C08K 5/14* | (2006.01) |
| *C08K 5/18* | (2006.01) |
| *C08K 5/43* | (2006.01) |
| *C08L 63/10* | (2006.01) |
| B29C 73/02 | (2006.01) |
| C08K 5/00 | (2006.01) |
| C08K 5/47 | (2006.01) |
| C08K 5/544 | (2006.01) |

(52) U.S. Cl.
CPC ............. *C08K 5/0091* (2013.01); *C08K 5/47* (2013.01); *C08K 5/544* (2013.01)

(56) References Cited

U.S. PATENT DOCUMENTS

| | | | | |
|---|---|---|---|---|
| 3,625,875 A | * | 12/1971 | Frauenglass | C08F 291/02 156/332 |
| 3,704,264 A | * | 11/1972 | Gorman | B01J 13/185 252/182.28 |
| 3,757,828 A | * | 9/1973 | Frauenglass | C08F 299/024 428/35.8 |
| 3,814,156 A | * | 6/1974 | Bachmann | F16B 39/34 411/428 |
| 3,826,673 A | * | 7/1974 | Batson | B05D 7/52 427/409 |
| 3,855,040 A | * | 12/1974 | Malofsky | C09J 4/00 428/451 |
| 3,922,449 A | * | 11/1975 | Bolger | F16B 11/006 156/332 |
| 4,325,985 A | * | 4/1982 | Wallace | F16B 33/06 427/205 |
| 4,417,028 A | * | 11/1983 | Azevedo | C08F 291/00 428/209 |
| 4,428,982 A | * | 1/1984 | Wallace | F16B 33/06 427/337 |
| 4,439,600 A | * | 3/1984 | Moran, Jr. | C08G 18/8175 528/392 |
| 4,442,138 A | * | 4/1984 | Bich | C09D 4/00 428/377 |
| 4,497,916 A | * | 2/1985 | Cooke | C09J 4/00 526/204 |
| 4,632,944 A | * | 12/1986 | Thompson | C09J 4/00 522/182 |
| 4,731,146 A | * | 3/1988 | Clark | C09J 4/00 526/240 |
| 4,750,457 A | * | 6/1988 | Bonutti | B65D 1/0238 156/92 |
| 4,824,500 A | * | 4/1989 | White | B29C 73/04 29/402.09 |
| 4,990,281 A | * | 2/1991 | Clark | C09J 4/00 526/240 |
| 5,116,558 A | * | 5/1992 | Wrobel | F16J 15/14 264/53 |
| 5,169,571 A | * | 12/1992 | Buckley | B29C 70/504 425/371 |
| 5,811,473 A | * | 9/1998 | Ramos | C11D 7/5018 524/319 |
| 5,859,160 A | * | 1/1999 | Righettini | C08F 212/04 526/318 |
| 6,166,146 A | * | 12/2000 | Suto | C08F 253/00 525/263 |
| 6,596,808 B1 | * | 7/2003 | Newberth, III | C09J 4/06 524/832 |
| 6,676,795 B1 | * | 1/2004 | Levandoski | C09J 175/16 101/167 |
| 7,976,670 B2 | * | 7/2011 | Malofsky | C09J 4/00 156/332 |
| 8,333,866 B2 | * | 12/2012 | Kostick | B32B 1/02 156/313 |
| 2004/0102566 A1 | * | 5/2004 | Forray | C09J 5/06 524/502 |
| 2005/0008832 A1 | * | 1/2005 | Santos | H01L 25/50 257/E21.705 |
| 2007/0023975 A1 | * | 2/2007 | Buckley | B29C 70/543 264/494 |
| 2009/0208684 A1 | * | 8/2009 | Dunleavy | B29C 70/10 156/60 |
| 2009/0229747 A1 | * | 9/2009 | Olson | C08J 5/244 526/318.4 |
| 2012/0180950 A1 | * | 7/2012 | Attarwala | C09J 4/00 524/533 |
| 2018/0237661 A1 | * | 8/2018 | Ledwith | C09D 133/10 |
| 2019/0031921 A1 | * | 1/2019 | Mullen | C09J 4/06 |
| 2019/0112438 A1 | * | 4/2019 | Rushing | C08J 5/249 |
| 2019/0112440 A1 | * | 4/2019 | Rushing | C08J 5/08 |
| 2021/0395473 A1 | * | 12/2021 | Rushing | C08J 5/042 |

\* cited by examiner

ANAEROBIC COMPOSITE MATRIX RESINS

This application is a divisional of U.S. patent application Ser. No. 16/173,570, which is a continuation-in-part of and claims priority to U.S. patent application Ser. No. 16/157,386, filed Oct. 11, 2018, entitled "Anaerobic Composite Matrix Resins," which claims priority to U.S. Provisional Patent Application No. 62/571,349, filed Oct. 12, 2017, entitled "Anaerobic Composite Matrix Resins." The entire contents of the foregoing applications are hereby incorporated by reference.

The present disclosure pertains to novel composite materials useful for composite repair and composite part fabrication.

This invention was made with government support under Contract No. N68335-16-C-0242 awarded by the U.S. Navy, Naval Air Systems Command. The government has certain rights in the invention.

BACKGROUND

Materials and techniques for fabrication of fiber reinforced composite materials that exhibit elevated temperature performance have several limitations. A common measure of thermal performance is the delivered glass transition temperature (Tg) of the fabricated composite. Matrix resins for elevated temperature composite applications typically have two-components that require mixing, or are pre-impregnated on the fiber reinforcement. The pre-impregnated versions suffer from short shelf-life and must be stored at sub-ambient temperatures to prevent premature gellation of the resin system. Elevated Tg matrix resins commonly have excessive viscosities, which require heating during processing to reduce viscosity and maximize consolidation with the fiber reinforcement.

High temperature laminating resins often require elevated temperature curing. Resins with elevated Tg that cure at ambient temperatures have previously been developed that cure via ultraviolet light (UV). However, these UV curing acrylate resins are limited to use with fiberglass or quartz fabrics. Their efficacy with carbon fiber reinforcements is problematic due to the strong UV absorption of the carbon.

What is needed is a composite fabrication system that does not require heat or UV energy to initiate cure, yet that delivers composites capable of high temperature service conditions.

SUMMARY

The present disclosure pertains to low viscosity ambient temperature curing composite matrix resin systems that eliminates the need for heating to achieve cure. Compared to previous resin technologies, the composite resin system will cure completely when carbon fiber is used as the reinforcement. The resin is also compatible with fiberglass and quartz reinforcements.

The resins have the potential to reduce costs currently associated with composite fabrication. The resin system can be used for original composite part fabrication or for repair of damaged composite parts. With regards to the latter, the matrix resins developed will provide repairs having equivalent strength, while reducing the support equipment and man-hours per repair. The resin system developed can be cured at ambient temperatures. Without postcure the resin will provide a glass transition temperature more than 350° F. (177° C.). The resulting composites also exhibit high fiber strength translation. The implications are significant in terms of the ease of use and elimination of procedural steps. While the resin system was developed specifically for vacuum bagging, it is expected to be viable for other composite fabrication methods including out of autoclave (OOA), resin transfer molding (RTM) and vacuum-assisted resin transfer molding (VARTM).

Acrylate based resin systems were formulated to cure anaerobically. The result is a resin that is stable at room temperature for months in the presence of atmospheric oxygen. Therefore, one embodiment is a stable prepreg material (i.e., fabric reinforcement that has been "pre-impregnated" with a resin system) that will only cure after application to the repair area when under vacuum bagging conditions, which removes oxygen and allows cure of the part at ambient temperatures.

Resins that cure anaerobically were first discovered in the 1940's, when it was found that acrylate based adhesives formulated with specific curatives, form metal-to-metal bonds in the absence of oxygen. A key factor in the cure mechanism is the need for metal catalysis. For metal bonding applications, the catalytic metal is supplied at the substrate interface. Copper and iron are well known to increase kinetics of reaction whereas cadmium or zinc are inactive. After the adhesive is applied, which removes access to oxygen, peroxides form free radicals under the catalytic effect of metal ions.

Anaerobically curing matrix resins for composite applications has not been investigated. The reason for this lack of research in the use of anaerobic resins for composites is likely due to the absence of metal ions on the surface of common reinforcements.

The matrix resin technology described herein is based on an anaerobic curing approach that will potentially transform not only composite repairs, but several composite fabrication areas in general. Embodiments of the technology have been demonstrated whereby a unique sizing agent system is used to treat reinforcements with organometallic compounds, which serve as catalysts in the anaerobic reaction. When the formulated matrix resin is applied to the treated reinforcement, cure is not initiated until the impregnated fabric is exposed to an oxygen free atmosphere. This occurs during the vacuum bagging process, where the resin cures to a rigid cross-linked network at ambient temperatures. The curing agent package, which composes less than 5% of the formulation in preferred embodiments, is based on the proper balance of aromatic amine(s) and hydroperoxides, and saccharin. The curing agent package may include combinations of peroxide initiators, such as cumene hydroperoxide, aromatic amine accelerators, and benzoic sulfimide (saccharin). Additional preferred embodiments also use a cure promoter/silane adhesion promoter applied to the carbon fiber fabric reinforcement.

DETAILED DESCRIPTION OF PREFERRED EMBODIMENTS

The present disclosure relates to anaerobically curing composite resin systems. Preferably, the system is composed of acrylate based resin materials and curing agents that promote cure under anaerobic conditions. In certain embodiments the system is composed of acrylate based resin materials and a primer including a catalyst. An additional preferable aspect involves treatment of the fiber reinforcement with an organometallic catalyst sizing system, also referred to as a promoter/silane adhesion promoter solution, or activator sizing agent. The treated reinforcement is therefore rendered a part of the curing mechanism. The composite system is designed to cure only when the resin comes into contact with the fiber reinforcement and is in an anaerobic state. Such anaerobic conditions commonly occur in composite fabrication methods such as vacuum bag molding and closed molding.

Anaerobic ally curing resins commonly contain a free-radically polymerizable acrylate ester monomer, together with a peroxy initiator and an inhibitor component. Often, such anaerobic resins also contain accelerator components to increase the cure speed of the composition.

The basic components in preferred embodiments of the matrix resin include acrylate based resin materials, including acrylate monomers and polymers blended to provide the desired mechanical and thermal properties. Useful acrylates include monomers and oligomers derived from bisphenol-A dimethacrylate, hydrogenated bisphenol-A dimethacrylate, and ethoxylated bisphenol-A dimethacrylate. These include polybutadiene dimethacrylate and polybutadiene acrylonitrile dimethacrylate, also referred to as methacrylate-functional butadiene copolymer. In preferred embodiments, the acrylonitrile content in the polybutadiene acrylonitrile dimethacrylate is about 21-22, or preferably 21.5, percent. Additional preferred monomers and oligomers may be derived from methyl methacrylate, methacrylic acid, tris (2-hydroxy ethyl) isocyanurate triacrylate, Isobornyl methacrylate, tetrahydrofurfuryl methacrylate, hydroxypropyl methacrylate, tricyclodecane dimethanol diacrylate, and hexafunctional aromatic urethane acrylate. Various useful urethane-acrylate type monomers include those derived from chemical linking of precursor "prepolymers" then "capping" with (meth) acrylate.

A description of examples of preferred acrylate monomers and oligomers used for formulation of preferred embodiments of the matrix resins is shown in Table 1 below.

TABLE 1

ACRYLATE MONOMERS AND OLIGOMERS

| Resin Component | Description/ [Commercial Product Number] | Structure |
|---|---|---|
| Epoxy acrylate oligomer | Imparts flexibility, excellent adhesion, and low shrinkage [CN UVE 151, Sartomer (Exton, PA)] | |
| Tris (2-hydroxy ethyl)iso-cyanurate triacrylate | Fast cure response, adhesion, weatherability, high impact strength, low shrinkage and hardness. [SR368, Sartomer] | |

TABLE 1-continued

ACRYLATE MONOMERS AND OLIGOMERS

| Resin Component | Description/ [Commercial Product Number] | Structure |
|---|---|---|
| Isobornyl methacrylate | Excellent reactive diluent for oligomers. The cyclic group produces polymers through free radical curing which have a high glass transition temperature. [SR423A, Sartomer] | |
| Hexafunctional aromatic urethane acrylate oligomer | A hexafunctional aromatic urethane acrylate oligomer with excellent cure response, low viscosity, and very high crosslink density. [CN975, Sartomer] | |
| Tetrahydrofurfuryl methacrylate (THFMA) | Monofunctional methacrylate monomer offers low viscosity, low shrinkage, high hardness, high solvency, good adhesion, good balance of mechanical properties | |
| Tricyclodecane Dimethanol Diacrylate | Low viscosity difunctional acrylate monomer that provides high Tg, high flexibility, and low shrinkage. | |

The curing agent package may include combinations of peroxide initiators, such as cumene hydroperoxide, aromatic amine accelerators, and benzoic sulfimide (saccharin). Common initiators include one or more of cumene hydroperoxide, t-butylhydroperoxide, p-methane hydroperoxide, diisopropylbenzene hydroperoxide, pinene hydroperoxide, and methyl ethyl ketone peroxide. Anaerobic cure-inducing compounds to accelerate cure can include saccharin and an aromatic amine. Examples of preferable aromatic amines include one or more of N,N-diethyl-p-toluidine, N,N-dimethyl-o-toluidine, and acetyl phenylhydrazine (APH), N,N-dimethylaniline, N,N-dimethyl-p-toluidine, N,N-dimethyl-p-anisidine, N,N-diethylaniline, and N,N-bis-(2-hydroxyethyl)-p-toluidine.

Various additives can be added to the resin formulation, and stabilizers are typically added to prevent premature polymerization. The addition of stabilizers is important to maximize long-term room temperature stability. Preferred stabilizers include chelators such as tetrasodium ethylenediamine tetraacetic acid to scavenge extraneous metal ions. Radical inhibitor additives may also be included in the formulation, such as hydroquinone or naphthoquinone. Additives for viscosity control include fumed silica, also known as pyrogenic silica.

The composite materials can be produced by conventional manufacturing processes that are capable of anaerobic conditions. These processes include Resin Transfer Molding (RTM), Vacuum Assisted Resin Transfer Molding (VARTM), vacuum bag molding, and filament winding. However, compared to previous state of the art materials, these new materials do not require elevated temperature cure to achieve the desired high glass transition temperatures. Thus, the cost associated with heating equipment and energy usage is expected to be lower compared to conventional composite materials.

One preferred embodiment is the use of the anaerobic resin system with carbon fiber reinforcements that have been treated with compounds to facilitate cure and adhesion of the matrix resin. A solution containing accelerators and adhesion promoters can be used as a fiber sizing agent for the carbon fiber. The accelerator/adhesion promoter solution is applied to the carbon fiber and allowed to dry, leaving residual accelerator/adhesion promoter coating in the form of organometallic compounds on the reinforcement material. After evaporation, the amount of accelerator/adhesion promoter composition that adheres to the carbon fiber is preferably in the range of 0.1 to 5 percent based on the weight of the carbon fiber.

Particularly suitable accelerators include compounds containing transition metal ions. Preferred transition metals include copper, manganese, chromium, iron, cobalt, nickel, and molybdenum. More preferred is copper. The oxidation state of the transition metal is not crucial, but the lower oxidation state which can be oxidized is rather preferred. The transition metal compound may be in the form of an inorganic or organometallic compound, including oxides, salts, and organometallic chelates and complexes. Appropriate inorganic salts include the sulfates, nitrates, chlorides, bromides, phosphates, and sulfides. Suitable organic salts include the alkoxides, including methoxides and ethoxides, as well as the carboxylates, including the acetates, hexoates, octoates, ethylhexanoates, and naphthenates. Other suitable transition metal complexes include the acetylacetonates and the hexafluoroacetylacetonates. More preferably, the transition metal compound is selected from the group consisting of copper acetylacetonate, copper ethylhexanoate, copper acetate, copper naphthenate, copper octoate, copper hexoate, and copper hexafluoroacetylacetonate. Most preferably, the transition metal compound is copper acetylacetonate.

Preferred adhesion promoters include amino silanes, such as gamma-aminopropyltrimethoxy silane, gamma-aminopropyltriethoxy silane, N-(betaaminoethyl)-gamma-aminopropyltriethoxy silane, and the like. However, other organo silanes can be utilized as well as the corresponding silanols and polysiloxanes.

An example of accelerator/adhesion promoter adhesion promoter solution, or activator sizing agent, includes copper acetylacetonate (2% w/w) and gamma-aminopropyltrimethoxy silane (1%) in methylene chloride. Lower concentrations of both the accelerator and adhesion promoter were found to be effective. The preferred range for the accelerator component is 0.2 to 5% weight in solution. The preferred range for the adhesion promoter is 0.1 to 3 percent by weight in solution.

Additional preferred embodiments utilize an anaerobic primer system to improve adhesion to cured composite substrates. The primer was designed to interact with the cured composite substrate to improve adhesion. In addition, it increases the cure rate of the anaerobic matrix resin at the interface. During practical use, the primer is applied to the prepared substrate before the impregnated repair plies are applied. The carbon fiber in the repair plies will already contain the metal activating sizing agent to promote rapid cure. The primer will also contain a metal activating cure promoter to increase the cure rate at the interfaces between the cured laminate and the repair laminate.

Structural composite sections, where repairs are typically applied, can be considered to be relatively non-polar in nature (compared to some polymers and metals). Polarity of the substrate affects its surface energy, which is what enables the matrix resin to wet out the substrate. Clearly, the more the matrix resin is able to wet out, the surface area penetrated is increased and better adhesion achieved. Preferred embodiments of the primer include a solvent, one or more acrylate based resin materials, one or more additional elastomeric materials, and a catalyst of accelerator including a transition metal. The solvent may include tertiary butyl acetate, for substrate wetting, and the one or more acrylate based resin materials may include monomers and/or oligomers derived from, for example, hydroxypropyl methacrylate, isobornyl methacrylate, hexafunctional aromatic urethane acrylate, and methacrylic acid. These acrylate resin materials function to promote adhesion to the carbon fiber and substrate, increase hydrophobicity, serve as a toughener, and increase reactivity. One or more additional elastomer materials such as chlorsulfonated polyethylene, which functions as a toughener, may also be present. Preferred embodiments of the primer may also include copper ethylhexanoate as a catalyst.

Each component of preferred embodiments of the primer performs a specific function. The hydroxypropyl methacrylate improves chemical adhesion by a hydrogen bonding mechanism through the hydroxyl groups. Isobornyl methacrylate acts as a diluent, but also improves the thermal properties and adhesion. The methacrylic acid and urethane acrylate are intended to increase reactivity and crosslink density of the cured primer. Finally the copper ethylhexanoate is incorporated to promote the anaerobic cure rate at the bonded interfaces. The primer also incorporates an elastomeric toughener, chlorosulfonated polyethylene, and copper ethylhexanoate to accelerate the anerobic cure rate. The primer can be used in conjunction with matrix resins prepared in accordance with preferred embodiments described herein.

Preferred embodiments described herein are preferably used as a matrix resin for carbon fiber reinforced composites. The types of carbon fiber that can be used with this resin include unidirectional and woven products. These carbon fiber reinforcements are available from several manufacturers including Toray Industries Inc., Toho Tenax Co. Ltd., U.S., Zoltek Companies Inc., and Hexcel Corp.

The preferred curing method involves inducing an anaerobic state around the impregnated carbon fiber reinforcement. Some composite fabrication techniques employ vacuum assistance as part of the impregnation and compaction process. The use of vacuum inherently produces an anaerobic state, wherein the materials of the present invention would be viable. Examples of this include vacuum bag molding and resin transfer molding. Other composite fabrication techniques could be modified to introduce an anaerobic state, either by use of vacuum or purging the process equipment or molds with a gas that is oxygen-free.

Example 1

Exemplary Formulations

Carbon fiber reinforcement cloth used in the following examples was Hexcel style 282 made with AS4 input fiber.

Combinations of the acrylate monomers and oligomers listed in Table 1 can be used in preferred embodiments of the matrix resin. One particularly advantageous preferred embodiment of a resin formulation is described in Table 2 below. This Example resin system was designated internally as AC-1291. It contains methyl methacrylate, methacrylic acid, epoxy acrylate, tris (2-hydroxyethyl) isocyanurate triacrylate, hexafunctional aromatic urethane acrylate, and isobornyl methacrylate. The curing agent components included saccharin, N,N-dimethylaniline, and cumene hydroperoxide.

TABLE 2

| AC-1291 ACRYLATE RESIN SYSTEM | |
|---|---|
| Component | % |
| Resin components: | |
| Methyl Methacrylate | 7.89 |
| Methacrylic Acid | 9.86 |
| Epoxy acrylate | 42.31 |
| Tris (2-hydroxyethyl) isocyanurate triacrylate | 20.19 |

TABLE 2-continued

AC-1291 ACRYLATE RESIN SYSTEM

| Component | % |
|---|---|
| Isobornyl methacrylate | 12.62 |
| Hexafunctional aromatic urethane acrylate | 4.89 |
| Curative components: | |
| Benzoid sulfimide (Saccharin) | 0.79 |
| N,N-Dimethylaniline | 0.14 |
| Cumene Hydroperoxide | 1.31 |
| Total | 100.0 |

Figure 1:
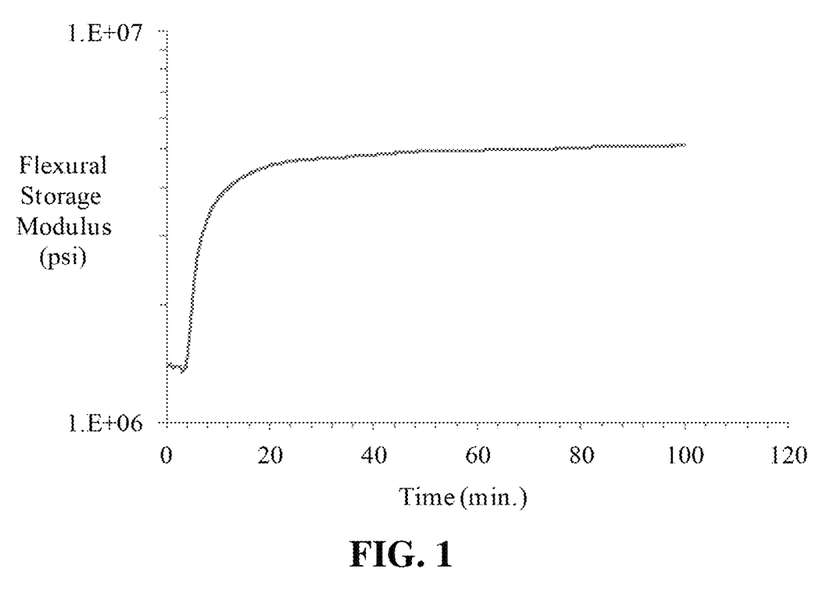
FIG. 1 shows the anaerobic cure profile for a preferred embodiment of a resin system with carbon fiber reinforcement and promoter solution at 23° C.

In an example, HEXCEL (Stamford, CT) HEXTOW IM7 carbon fiber was treated with a solution of gamma aminopropyltrimethoxy silane (1% w/w) and copper acetylacetonate (2% w/w) dissolved in methylene chloride. The solvent was allowed to evaporate from the carbon fiber, thus leaving an activated sizing component on the reinforcement. Eighteen strands of the treated carbon fiber reinforcement were then pulled into a thin flexible tube. The tube was then injected with the anaerobic epoxy acrylate resin (AC-1291), while fixtured in a dynamic mechanical analyzer (DMA). The dynamic modulus of the composite was measured at room temperature until no additional increase in modulus was observed. FIG. 1 shows the cure study results, the anaerobic cure profile for AC-1291 resin system with IM7 carbon fiber (2% promoter on fiber) at 73° F.

The cure rate was found to be very rapid when the copper acetylacetonate accelerator concentration in the fiber treatment was 2 percent, showing a cure onset of approximately 3 minutes. The specimen achieved full cure at room temperature within one hour of combining the anaerobic resin and activating carbon fiber fabric. After ambient temperature cure the glass transition temperature for this composite was determined to be 360° F. (182° C.) using DMA in the flexural mode.

Figure 2:
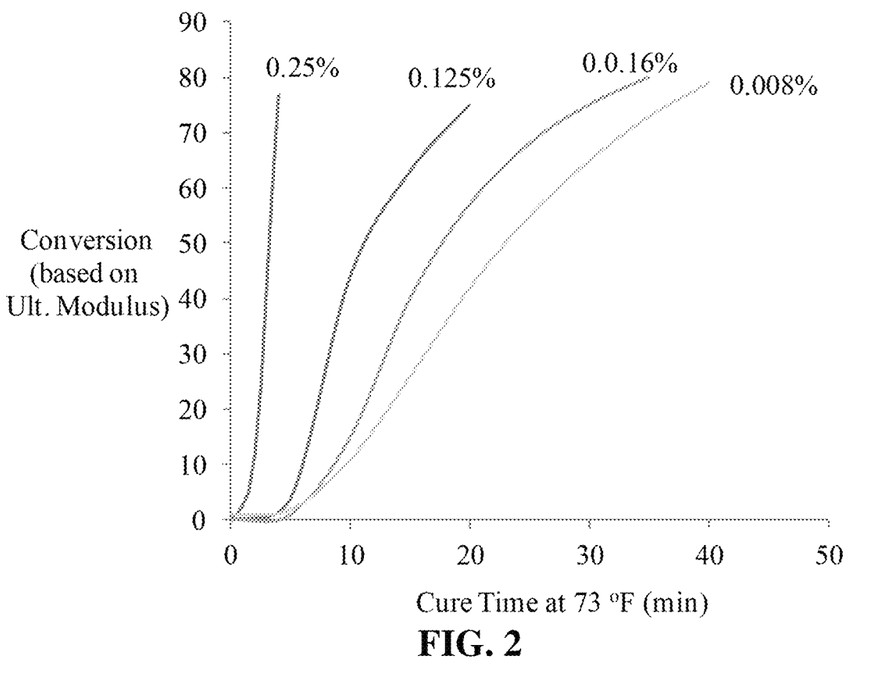
FIG. 2 shows the effect of promoter concentration applied to fiber on cure time at 23° C. with a preferred embodiment of a resin system.

Because of the rapid cure observed at room temperature with the two percent accelerator treatment, additional tests were performed using a range of promoter concentrations (0.008% to 0.25%.) FIG. 2 shows the effect of varying promoter level (applied to fiber) on level of cure at 73° F. for AC-1291, which is expressed as conversion relative to the ultimate modulus on the plot.

Example 3

Composite Fabrication

Woven carbon fiber fabric (HEXCEL HEXTOW AS4) was pretreated with a sizing containing 0.5 percent copper acetylacetonate accelerator and 1.0 percent gamma aminopropyltrimethoxy silane (adhesion promoter) dissolved in methylene chloride. After evaporation of the solvent, five plies of the woven carbon fiber fabric were impregnated with resin AC-1291 and debulked/cured in a vacuum bag for thirty minutes. The laminate which was approximately 4 inches square was allowed to cure for thirty minutes under vacuum. The exotherm was measured with a thermocouple and the maximum temperature recorded was 65° C. Larger panels were subsequently prepared using this same process.

Fabrication of larger test laminates was performed for evaluation of composite mechanical and thermal properties. The resin used for these trials was the preferred anaerobic resin AC-1291. No heating blankets were required and the laminate was simply cured by removal of oxygen during the vacuum bagging procedure. The AS4 carbon fiber was treated with the activator sizing agent (0.2% copper acetylacetonate (accelerator) and 1.0% gamma aminopropyltrimethoxy silane dissolved in methylene chloride. In this case the CuAcAC concentration was reduced to 0.2% in order to provide additional working time and to reduce excess exotherm.

Figure 3:
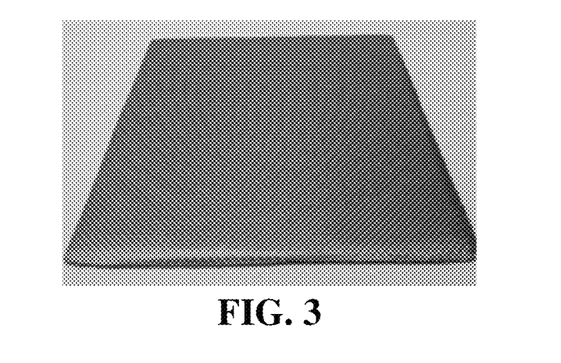
FIG. 3 shows a 20 ply AS4/plain weave carbon fiber laminate produced using a preferred embodiment of an anaerobic epoxy acrylate matrix resin.
Figure 4:
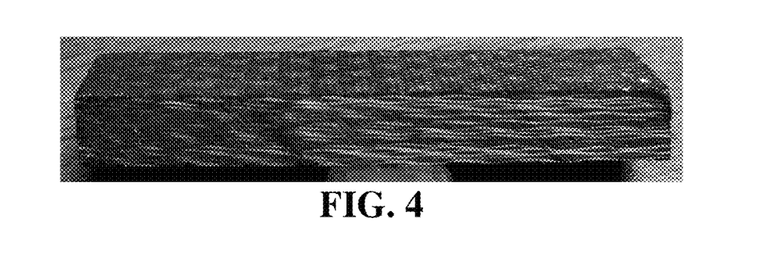
FIG. 4 shows a cross section of cured plain weave carbon fiber laminate produced using a preferred embodiment of an anaerobic epoxy acrylate matrix resin.

The resin maintained a low viscosity during the lay-up process. After pulling a vacuum on the part (25 in. Hg.) The temperature of the laminate began to increase as the anaerobic reaction was initiated. The maximum temperature measured from the exotherm was approximately 65° C. The ability to fabricate laminates up to 0.20 inches thick was demonstrated. The photograph in FIG. 3 shows the composite laminate prepared with the developed resin (AC-1291) and 20 plies of AS4 plain weave carbon fiber fabric. FIG. 4 is a photograph of the cured laminate cross section.

Composite sandwich panels are composed of thin, high strength composite skins separated by and bonded to lightweight honeycomb cores. These structures are commonly repaired on aircraft and require additional steps to ensure that mechanical properties are restored to the damaged area.

Figure 5:
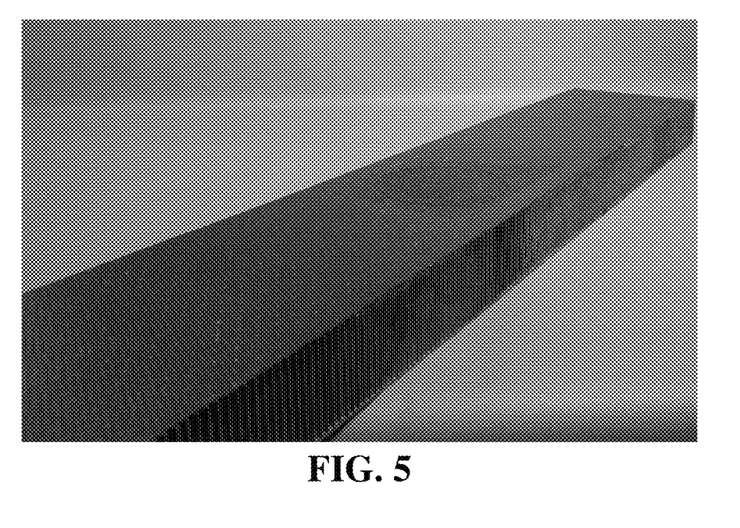
FIG. 5 shows a simulated repair performed on 2.0 in. Honeycomb sandwich composite.

A simulated 0.5 inch thick sandwich panel repair was prepared by cutting a 2.5 in diameter circular area from one of the laminate sides. Five AS4 carbon fiber patches, previously treated with activator, were cut to fill the void, and one final patch was applied that was approximately two inches larger in diameter. Each fabric patch was wet-out with AC-1291 resin. A second simulated repair was performed on a 2.0 inch thick sandwich panel using the same basic materials and process. A photograph of this cured repair after debagging is shown in FIG. 5.

Laminate repair simulations were performed using previously prepared epoxy/carbon fiber flat panels, 3 ft.×1 ft.× 0.168 in. An 8-inch diameter circular area was abraded in the middle of each panel, using a 90 degree die grinder and Scotchbrite pads. Plain weave AS4 carbon fiber cloth, that was previously treated with activator (0.2%), then cut into circular repair plies.

The circular plies were used to lay-up two simulated repairs, using a "wedding cake" stack configuration to simulate surface doubler repairs. For actual repairs, a tapered scarf repair would typically be done, with the repair plies laid with the smallest ply down first, then the next smallest ply, and so on, with the largest ply being the top repair ply. The reason that the lay-up was prepared in reverse order, with the large ply first and the smallest ply on the top, was to make each repair ply visible during fatigue testing of the cured repair section.

The previously abraded composite area was wet out with the AC-1291 resin, followed by laying the 7-inch diameter ply into the wet resin and additional resin on top of the ply, using the stiff short-bristle brush to work the resin down through the thickness of the ply. After thoroughly wetting out the first ply, additional resin was applied to wet out the subsequent ply. This process was repeated for all succeeding plies, with the 1-inch circular ply being applied last. Care was taken to ensure that all plies were thoroughly saturated with resin. All plies were laid up as symmetrical 0°/90° plain weave plies, to match the original structure.

The two sets of repair plies were wet out in the same way, from the same batch of mixed resin. Up to this point, the two repairs were treated identically. The difference between the two repair panels involved the vacuum bag bleeder schedules used. Panel 1 was bagged with an aggressive bleeder schedule, designed to pull out excess resin under vacuum.

Both parts (Panels 1 and 2) were connected to a vacuum pump at separate times. Panel 1 was connected to vacuum approximately 30 minutes prior to vacuum being applied to Panel 2. The vacuum pressure was maintained at 24 in Hg to extract air from both bags. Panel 1 was under full vacuum for 3 hours, and Panel 2 was under full vacuum for 2.5 hours. No thermal cure was required. When the panels were debagged, the resin appeared to be fully cured, and was hard to the touch, with no trace of tackiness.

Figure 6:
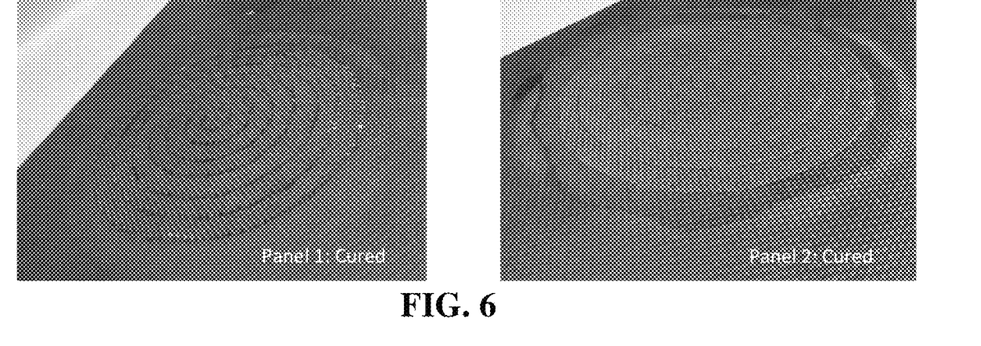
FIG. 6 shows a complete repair panel fabricated with treated plain weave carbon fiber and a preferred embodiment of a matrix resin.

After debagging both panels, it was noted that Panel 2 had a more resin rich surface compared to Panel 1. This was attributed to the more conservative bleeder schedule used for Panel 2. Photographs of the cured repair laminates are shown in FIG. 6.

Example 4

Testing of Composite Laminates

Interlaminar shear strength (ILSS) tests were performed according to ASTM Test Method D2344, Standard Test Method for Short-Beam Strength of Polymer Matrix Composite Materials and Their Laminates (astm.org/Standards/D2344.htm). Specimens were prepared using the AC-1291 resin system with IM7 carbon fiber reinforcement that was previously treated with a methylene chloride solution containing 0.2 percent copper acetylacetonate and 1 percent gamma aminopropyltrimethoxysilane. The carbon fiber was wet-out using AC-1291 anaerobic resin.

Forty two ends of the IM7 carbon tow wet-out with AC-1291 resin. The wetted fiber bundle was the pultruded through an enclosed metal die tubing section which removed oxygen availability from the resin. This induced the anaerobic cure conditions. The specimens' were allowed to cure at ambient temperature for 24 hours. After cure, the unidirectional laminate was extracted from the metal tubing and was cut into smaller specimens which were 1.0 in×0.17 in×0.17 in.

The individual ILSS specimens were positioned in an Instron test machine in a three point bend configuration. Support span was 0.63 inches, and the crosshead speed was 0.05 inches per minute. The maximum load was used to calculate the interlaminar shear strength.

Figure 7:
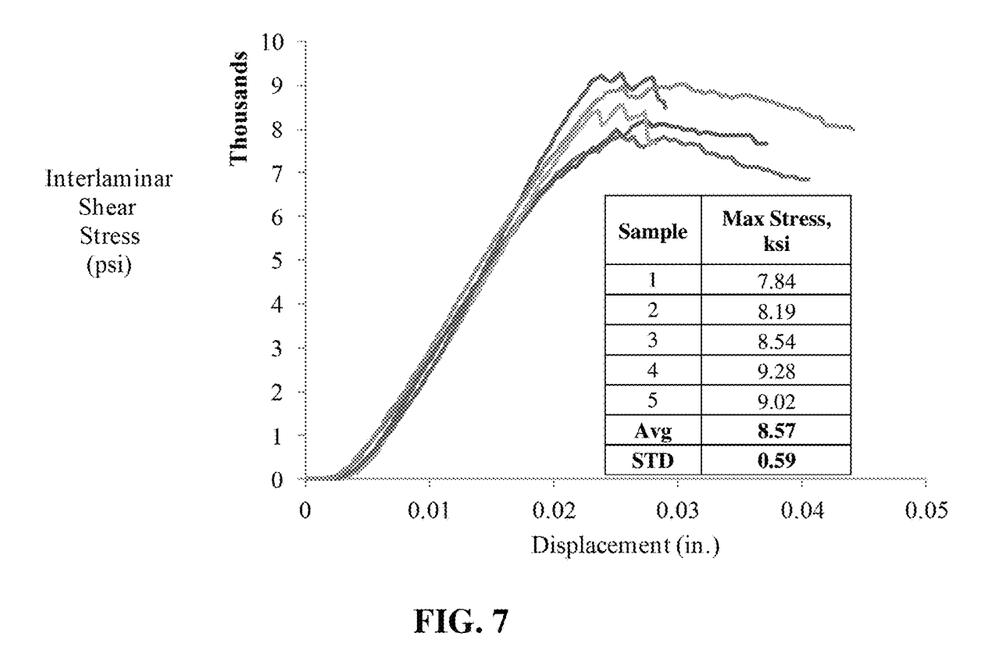
FIG. 7 shows the short beam shear results for IM7 unidirectional composite prepared with a preferred embodiment of an anaerobic resin.

FIG. 7 shows short beam shear results for IM7 unidirectional composite prepared with anaerobic resin AC-1291. The data presented in FIG. 7 shows that the AC-1291 matrix resin can deliver strengths comparable to laminates prepared with the standard EA-9390 matrix resin. An average ILSS of 8,570 psi was obtained.

Flexural properties were determined for the anaerobically cured composite prepared with 20 plies of AS4 carbon fiber fabric. The fabric was treated with a methylene chloride solution containing 0.2 percent copper acetylacetonate and 1 percent gamma aminopropyltrimethoxysilane. The carbon fiber was wet-out using AC-1291 anaerobic resin. A vacuum bag assembly was used to remove oxygen from the bagged laminate to promote cure. Vacuum was maintained for one hour at ambient temperature.

Four-point bend flexural tests were performed using composite specimens cut from test panel. Specimens having dimensions of 8 in.×0.5 in×0.20 in were used. The support span was six inches and the load span was 3 inches. A crosshead speed of 0.36 inches per minute was used to stress the specimens to failure. The flexural tests were performed at ambient temperature and humidity conditions according to ASTM D6272, Standard Test Method for Flexural Properties of Unreinforced and Reinforced Plastics and Electrical Insulating Materials by Four-Point Bending (astm.org/Standards/D6272). Based on the test results, the AC-1291 resin system was determined to provide acceptable flexural strength and modulus as shown by the data in Table 3.

TABLE 3

Flexural Strength And Moduli Results For Plain Weave AS4 Carbon Fiber Laminates Prepared With AC-1291 Matrix Resin

|  | Sample 1 | Sample 2 | Sample 3 |
|---|---|---|---|
| L (support span, in.) | 6.1 | 6.1 | 6.1 |
| b (sample width, in.) | 0.511 | 0.502 | 0.54 |
| d (sample thickness, in.) | 0.188 | 0.188 | 0.188 |
| Modulus msi | 9.4 | 9.4 | 9.2 |
| Modulus GPa | 65 | 65 | 63 |
| Max Stress, ksi | 68 | 67 | 67 |
| Max Stress, Mpa | 468 | 464 | 460 |

Lap-Shear Strength—The level of adhesion of the anaerobic matrix resin to cured composite laminates was determined. One inch wide strips were cut from a previously cured carbon fiber reinforced (CFR) composite which was prepared with AC-1291 resin and 10 plies of AS4 carbon fiber fabric. The fabric was treated with a methylene chloride solution containing 0.2 percent copper acetylacetonate and 1 percent gamma aminopropyltrimethoxysilane. The carbon fiber was wet-out using AC-1291 anaerobic resin. A vacuum bag assembly was used to remove oxygen from the bagged laminate to promote cure. Vacuum was maintained for one hour at ambient temperature. Cured specimens having dimensions of 6 in.×1 in.×0.10 in. were cut from the resulting laminate panel.

The cured one-inch wide composite strips were abraded with 120 grit sandpaper followed by cleaning by wiping with methyl ethyl ketone. The cleaned strips were then treated with a methylene chloride primer solution containing 0.2 percent copper acetylacetonate and 1 percent gamma aminopropyltrimethoxysilane. After allowing the primer to dry for one hour, AC-1291 anaerobic resin was applied to a one square inch area of each cured laminate strip adherend. A fiberglass scrim cloth was applied to maintain the bondline thickness to 0.010 inches. Two of the strips were then adhered to each other over the one square inch area. The anaerobic cure was allowed to proceed for twenty four hours. After cure, the samples were tested for lap-shear adhesion on an Instron test machine.

The lap-shear tests were performed according to ASTM D5868 Standard Test Method for Lap Shear Adhesion for Fiber Reinforced Plastic (FRP) (astm.org/Standards/D5868). The results for the tests, which were performed at 73° F., with a crosshead speed of 0.05 inches per minute, are described in Table 4. The average lap-shear strength observed was 1,451 psi.

TABLE 4

Lap-Shear Strength Test Results; Carbon Fiber/Epoxy Substrates Bonded with AC-1291 Anaerobic MatrixResin

| Specimen | Lap Shear Strength (psi) |
|---|---|
| 1 | 1,302 |
| 2 | 1,518 |
| 3 | 1,456 |
| 4 | 1,473 |
| 5 | 1,506 |
| AVG | 1,451 |

TABLE 4-continued

Lap-Shear Strength Test Results; Carbon Fiber/Epoxy Substrates Bonded with AC-1291 Anaerobic MatrixResin

| Specimen | Lap Shear Strength (psi) |
|---|---|
| STD | 87 |
| CV % | 6 |

Dynamic mechanical analysis testing was performed to determine the mechanical properties of cured laminates over a temperature range. Specimens were prepared with anaerobic resin (AC-1291) and treated AS4 plain weave carbon fiber fabric. A composite panel was prepared with AC-1291 resin and 10 plies of AS4 carbon fiber fabric. The fabric was treated with a methylene chloride solution containing 0.2 percent copper acetylacetonate and 1 percent gamma aminopropyltrimethoxysilane. The carbon fiber was wet-out using AC-1291 anaerobic resin. A vacuum bag assembly was used to remove oxygen from the bagged laminate to promote cure. Vacuum was maintained for one hour at ambient temperature. Cured specimens having dimensions of 1.2 in.×0.4 in.×0.1 in. were cut from the resulting laminate panel.

Figure 8:
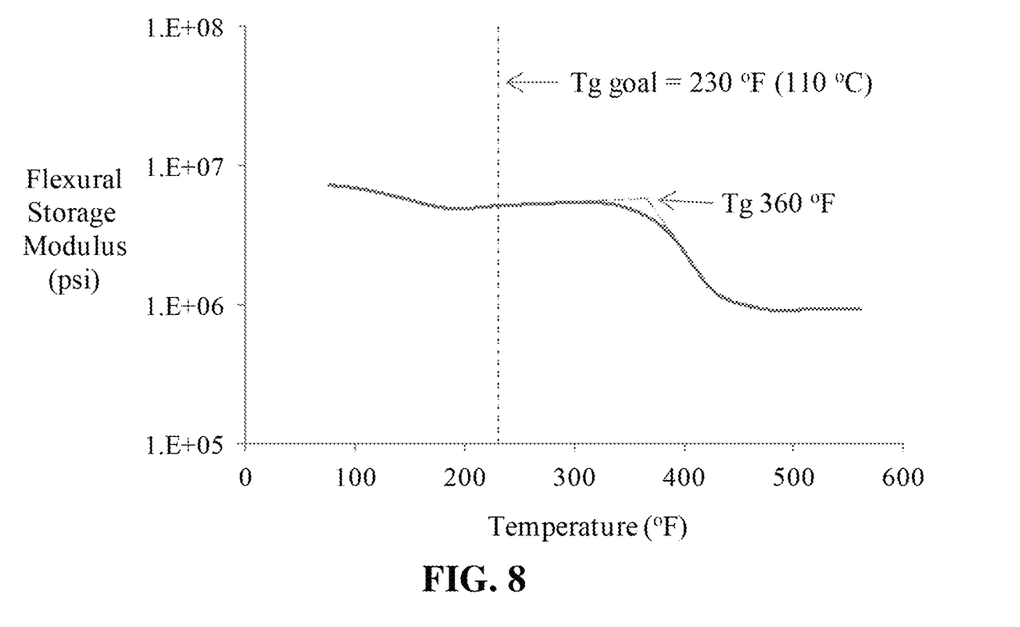
FIG. 8 shows the glass transition temperature for a preferred embodiment of a resin system reinforced with carbon fiber.
Figure 9:
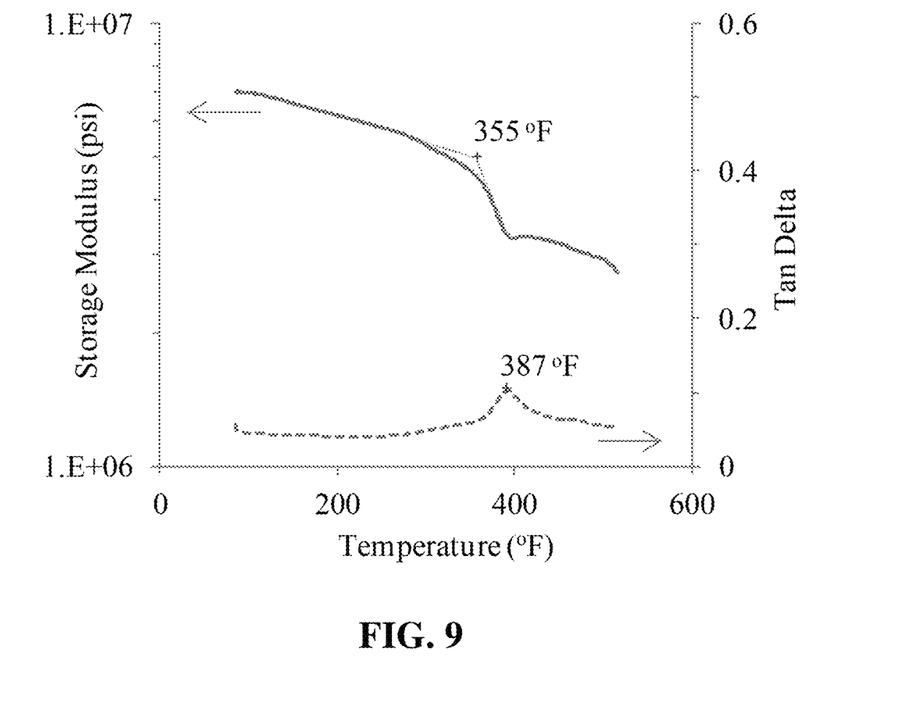
FIG. 9 shows the glass transition temperature for a commercially available resin reinforced with carbon fiber after cure.

Cured specimens were oscillated at a rate of 1 Hz in the single cantilever DMA mode while ramping the temperature at a rate of 10° C./min. (5.5° F./min.). FIG. 8 shows the DMA results obtained, or the glass transition temperature for the AC-1291 resin system reinforced with AS4 carbon fiber (2% promoter on fiber). For comparison, a similar composite was prepared and tested using EA-9390 conventional epoxy matrix resin as shown in FIG. 9. FIG. 9 shows dynamic mechanical analyses results for EA-9390 resin reinforced with AS4 carbon fiber; Tg after cure at 250° F. (121° C.). The glass transition temperature observed for the anaerobic was comparable to that of the composite fabricated with a standard HENKEL (Bay Point, CA) HYSOL EA-9390 resin, a two-component epoxy adhesive designed for composite repair. Both test laminates exhibited Tg's of approximately 360° F. (182° C.).

Figure 10:
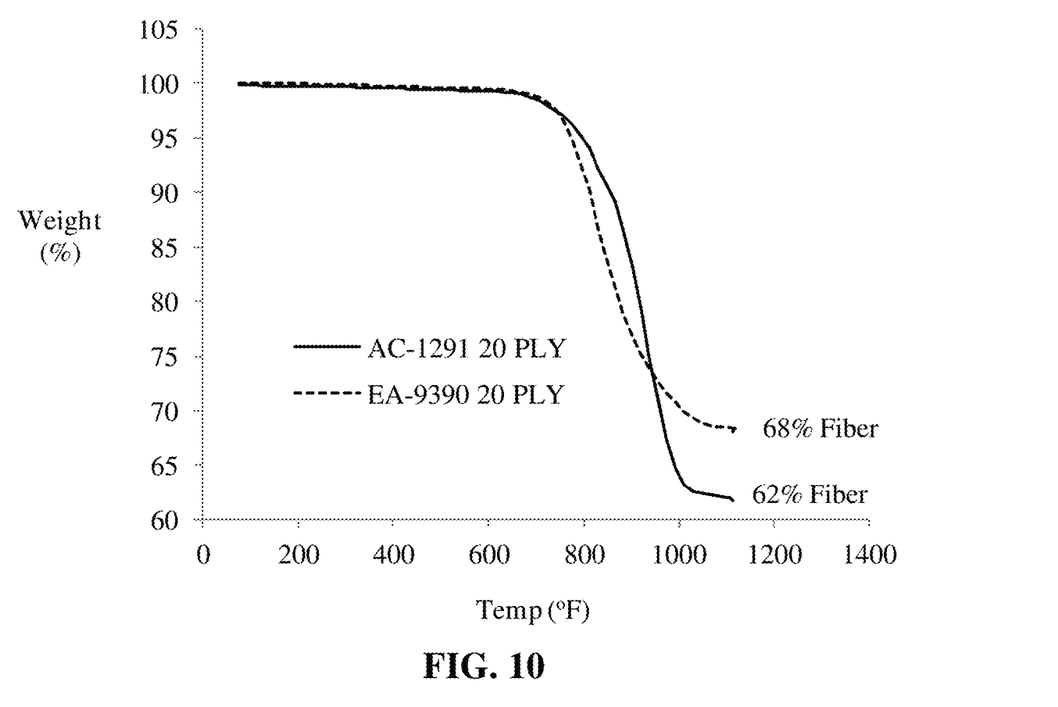
FIG. 10 shows the thermal stability of a preferred embodiment of a resin and a standard epoxy resin composite with plain weave carbon fiber fabric.

Thermogravimetric analysis (TGA) was performed using a TA Instruments Model 2950 Analyzer. Samples of the composites prepared as described in [0062]. However, the specimens for TGA tests were cut to dimensions of 0.1 in.×0.1 in.×0.1 in. Specimens were placed in a tared platinum pan and heated at a rate of 10° C. per minute (5.5° F. per minute) to 600° C. (1,112° F.). The tests were performed in a nitrogen atmosphere. FIG. 10 shows thermal stability of AC-1291 Resin and standard EA-9390 epoxy resin composites; 20 ply construction with AS4 plain weave carbon fiber fabric. The weight loss plots in FIG. 10 compare the thermal stability of the AC-1291 resin and the standard EA-9390 epoxy resin composites. The onset of thermal decomposition was approximately 800° F. for both the developmental resin and the standard resin. The weight percent fiber reinforcement remaining after elimination of the resin fractions is indicated on the plot as well. These weight percents translate into fiber volume percentages in the range of 48-55%.

Figure 11:
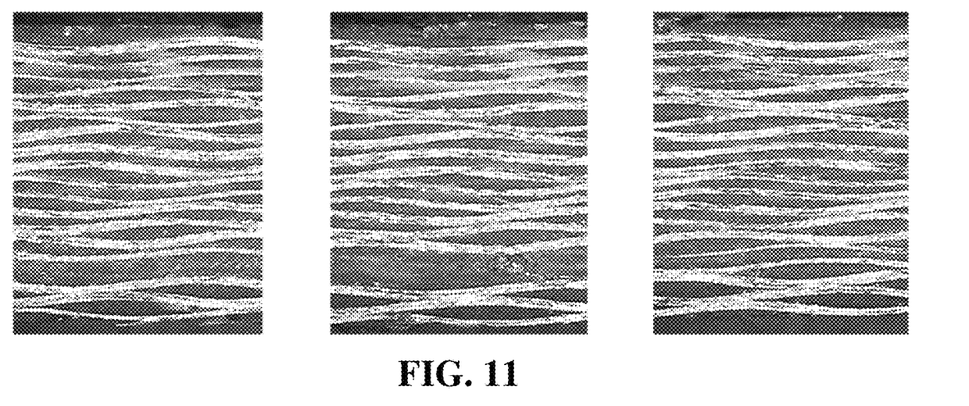
FIG. 11 shows photomicrographs of a composite cross section using a preferred embodiment of a resin.
Figure 12:
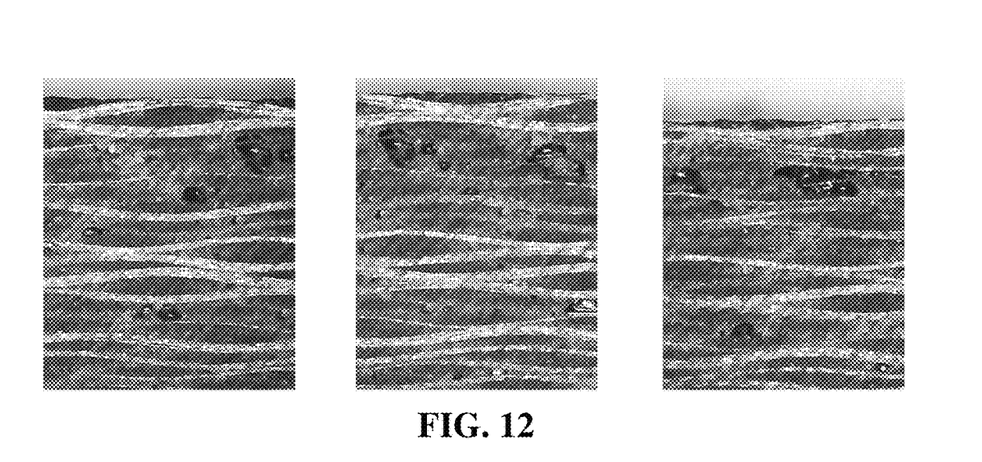
FIG. 12 shows photomicrographs of a composite cross section using a commercially available resin.

Void content testing of the composites was determined according to ASTM D2734, Standard Test Methods for Void Content of Reinforced Plastics (astm.org/Standards/D2734). The measured density of composite specimens was determined by the dry/wet weight method ASTM D792 Method A, Standard Test Methods for Density and Specific Gravity (Relative Density) of Plastics by Displacement (astm.org/Standards/D792). Specimens prepared according to the procedure described in [0054] for preparation of ILSS specimens. Specimens measuring 1.0 in×0.17 in×0.17 in. were weighed in air then weighed when immersed in distilled water at 23° C. Density was then calculated. After the actual density of the composite was determined, the resin fraction was removed using an isothermal thermogravimetric technique. The resin content was then calculated as a weight percent from TGA. By comparing the actual density to the theoretical density, void content was then calculated. Table 5 lists the resin, fiber, and void volume percents for AC-1291 and EA-9390 laminates prepared with AS4 plain weave carbon fiber. The percent void content was 0.35% for the AC-1291 laminate and 5.43% for the EA-9390 laminate. This difference in void content between the laminates can be seen visually in the photomicrographs in FIG. 11 and FIG. 12. FIG. 11 shows photomicrographs of AC-1291/AS4 20 ply composite cross sections. FIG. 12 shows photomicrographs of EA-9390/AS4 20 ply composite cross sections. The composite prepared with EA-9390 had a significantly higher level of porosity compared to the AC-1291 laminate.

TABLE 5

Resin, Fiber, and Void Volume Percents for AC-1291 and EA-9390 Laminates Prepared With AS4 Plain Weave Carbon Fiber

| Densities (g/cc) | | |
|---|---|---|
| EA-9390 | 1.00 | |
| AC-1291 | 1.05 | |
| Carbon Fiber | 1.79 | |
| | AC-1291 Resin 20 Ply AS4 Laminate | EA-9390 20 Ply AS4 Laminate |
| Wt % Fiber | 62.00 | 68.00 |
| Wt % Resin | 38.00 | 32.00 |
| Vol. of Fiber (cc) | 34.64 | 37.99 |
| Vol. of Resin (cc) | 36.19 | 32.00 |
| Total Volume | 70.83 | 69.99 |
| Vol % Fiber | 48.90 | 54.28 |
| Total Wt | 100.00 | 100.00 |
| Total Volume | 70.83 | 69.99 |
| Theoretical Density | 1.41 | 1.43 |
| Measured Density | 1.41 | 1.35 |
| % Voids | 0.35 | 5.43 |

Example 5

Primer and Resin Formulations

Tables 6 and 7 below provide details regarding the exemplary primer formulation and matrix resin formulations that were prepared and evaluated.

TABLE 6

Primer Formulation 5562

| Component | Function | % |
|---|---|---|
| Solvent (5050 TBAC) | Substrate wetting | 49.86 |
| Hydroxypropyl methacrylate (HPMA) | Promotes adhesion to carbon fiber and substrate | 23.93 |
| Chlorosufonated Polyethylene (CSPE) | Toughener | 11.97 |
| Isobornyl methacrylate (SR-423A) | Increases hydrophobicity | 5.98 |
| Hexafunctional Aromatic Urethane Acrylate Oligomer (CN-975) | Toughener | 5.98 |
| Methacrylic acid (MAA) | Increases reactivity | 1.99 |
| Copper Ethylhexanoate (CEHN) | Catalyst | 0.28 |
| | Total | 100.00 |

TABLE 7

Matrix Resin Formulation AC-5911

| Component | Function | Weight % |
|---|---|---|
| Epoxy acrylate | Primary monomer for strength | 34.98 |
| Tricyclodecane Dimethanol Diacrylate | Improves toughness and adhesion | 15.56 |
| Tris (2-hydroxyethyl) isocyanurate triacrylate | Enhances glass transition temperature | 15.56 |
| Methacrylic Acid | Diluent and Tg enhancer | 15.56 |
| Methacrylate-functional butadiene copolymer with 21.5% acrylonitrile | Toughener | 10.49 |
| Hydroxypropyl methacrylate | Improves adhesion to carbon fiber | 4.90 |
| Benzoic sulfimide | Anaerobic Cure promoter | 1.05 |
| Cumene Hydroperoxide | Catalyst | 1.70 |
| Dimethylaniline | Cure accelerator | 0.20 |
| | Total | 100.00 |

Figure 13:
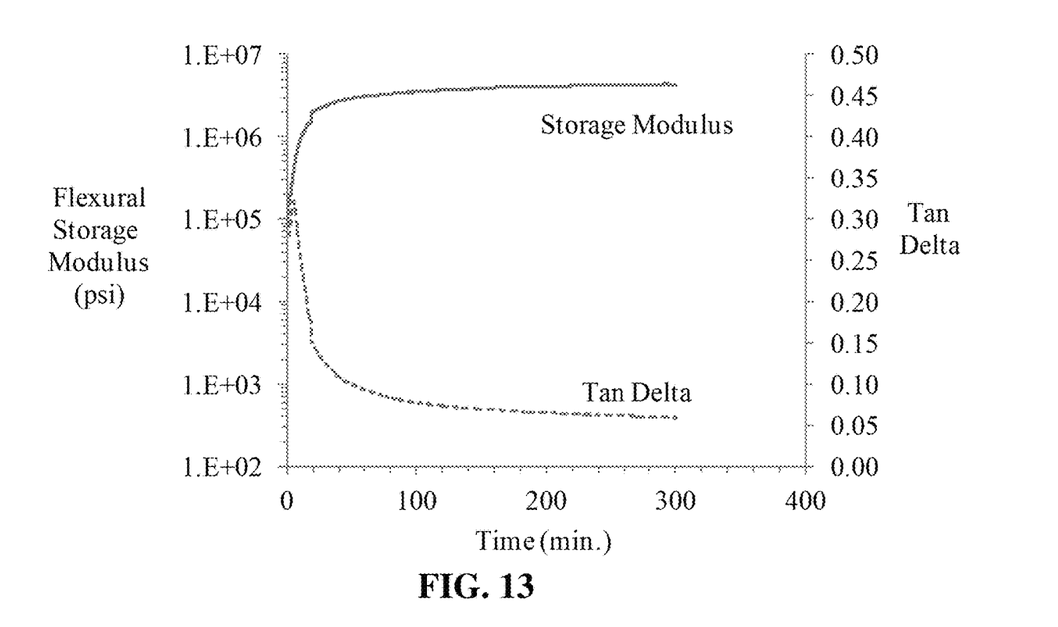
FIG. 13 shows the results for the anaerobic cure profile at 73° F. for AC-5911 Resin System/IM7 Carbon Fiber (2% promoter on fiber).
Figure 14:
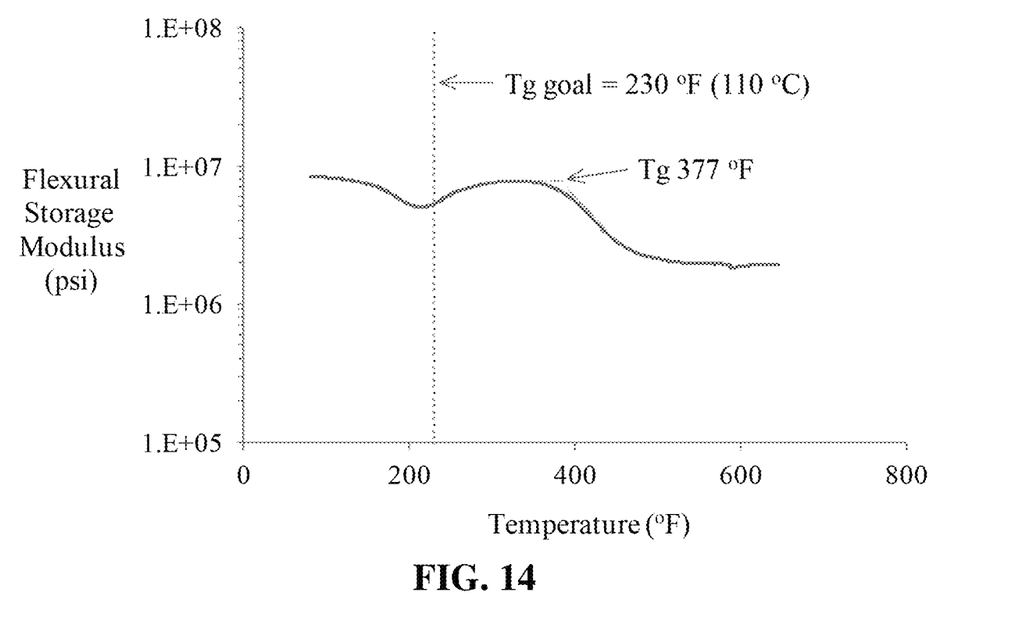
FIG. 14 shows flexural modulus vs. temperature for AC-5911 Resin System/IM7 Carbon Fiber.

The ambient temperature curing behavior of anaerobic matrix resin AC-5911 was determined by impregnating IM7-12K carbon fiber tow, which was previously sized with a dilute solution of the promoter/silane adhesion promoter. The sizing agent solution was applied to the carbon fiber and allowed to dry leaving residual promoter on the reinforcement. Eighteen strands of the reinforcement were then wet-out with the resin, then fixtured in a dynamic mechanical analyzer (DMA). The dynamic modulus of the composite was measured at room temperature until no additional increase in modulus was observed. FIG. 13 shows the results for the anaerobic cure profile at 73° F. for AC-5911 Resin System/IM7 Carbon Fiber (2% promoter on fiber). This resin system achieved full cure at room temperature within one hour of fabrication. After ambient cure the glass transition temperature for this composite was determined to be 377° F. (192° C.) using DMA in the flexural mode, as shown in FIG. 14. This Tg is significantly higher compared to previous matrix resins developed.

Lap Shear Testing. To simulate an actual repair patch, a carbon fiber ply was impregnated with anaerobic matrix resin AC-5911 and sandwiched between two composite substrate pieces that had been previously primed with Primer 5562. The primer, described in Table 6 above, was applied to the solvent wiped substrates. Hexcel style 282 fabric made with AS4 input fiber was then wet-out with anaerobic matrix resin AC-5911, and applied directly to the primed specimens. The specimens were cured anaerobically for 24 hours prior to testing. A crosshead displacement rate of 0.05 inches per minute was used with a sampling rate of 10 points per second. The results obtained were a significant improvement compared to the previous lap-shear data, as shown in Table 8 below.

TABLE 8

Comparison of Lap Shear Test Results for Primer 5562 and Matrix Resin AC-5911 Adhering CFRP Laminates

| Primer | None | 5562 |
|---|---|---|
| Matrix Resin | AC-1291 | AC-5911 |
| Lap Shear Strength (psi) | | |
| Spec. 1 | 1,302 | 1,833 |
| 2 | 1,518 | 2,020 |
| 3 | 1,456 | 2,150 |
| 4 | 1,473 | 1,779 |
| 5 | 1,506 | 2,313 |
| AVG | 1,451 | 2,019 |
| STD | 87 | 221 |
| CV % | 6 | 11 |

Interlaminar Shear Strength Tests. Interlaminar shear strength (ILSS) was determined according to ASTM Test Method D 2344. This test, commonly known as the short-beam strength (SBS) test, attempts to quantify the interlaminar (out-of-plane) shear strength of parallel fiber reinforced composites. Table 9 below contains the ILSS data obtained with composite specimens prepared with matrix resin AC-5911. The substitution of the polybutadiene dimethacrylate with polybutadiene acrylonitrile dimethacrylate significantly increased the ILSS compared to the previously tested anaerobic resin compositions.

TABLE 9

Interlaminar shear strength Results for Laminates Prepared with Matrix Resin AC-5911

| | Laminar Shear Strength (ksi) |
|---|---|
| Spec. 1 | 10.01 |
| 2 | 10.11 |
| 3 | 9.04 |
| 4 | 9.12 |
| 5 | 10.13 |
| Mean: | 9.68 |
| Stnd. Dev. | 0.55 |
| CV % | 5.71 |

Tensile Property Tests. Tensile testing was performed on composite specimens prepared with matrix resin formulation AC-5911 according to ASTM D-638. Five test specimens were tested. The crosshead speed for loading of tensile specimens was 0.2 inches per minute. Based on the results obtained, shown in Table 10 below, resin system AC-5911 appears to be more than adequate in terms of the delivered composite tensile strength.

TABLE 10

Tensile Strength Results for Composite Specimens Prepared with Matrix Formulation AC-5911

| Specimen Number | Stress at Break (ksi) |
|---|---|
| 1 | 149.13 |
| 2 | 144.04 |
| 3 | 154.46 |
| 4 | 144.97 |
| 5 | 153.58 |
| AVG | 149.24 |
| STD | 4.78 |
| CV % | 3.20 |

What is claimed is:

1. A method for repairing a composite material having a damaged region, comprising:
   treating at least a portion of the damaged region of the composite material with a primer to produce a primer-treated damaged region;

pre-treating a reinforcement matrix with an activator sizing agent by applying a solution of the activator sizing agent to the reinforcement matrix and allowing the reinforcement matrix to dry, whereby the reinforcement matrix is coated with a residual coating of organometallic compounds, to produce a pre-treated reinforcement matrix;

sizing the pre-treated reinforcement matrix to an appropriate size for application to the primer-treated damaged region;

placing the pre-treated reinforcement matrix on the primer-treated damaged region;

impregnating the pre-treated reinforcement matrix with an anaerobically curing matrix resin, wherein the anaerobically curing matrix resin contacts the primer in the primer-treated damaged region, wherein the anaerobically curing matrix resin comprises acrylate based resin materials and curing agents, and wherein the curing agents comprise peroxide initiators, aromatic amine accelerators, and benzoic sulfimide, to form a pre-cured composite matrix resin at the primer-treated damaged region; and exposing the pre-cured composite matrix resin to anaerobic conditions, to form an anaerobically cured composite matrix resin to repair the damaged region of the composite material.

2. The method of claim 1, wherein the reinforcement matrix is carbon fiber, fiberglass, or quartz.

3. The method of claim 1, wherein the activator sizing agent is copper acetylacetonate and gamma-aminopropyltrimethoxy silane dissolved in methylene chloride.

4. The method of claim 1, wherein the acrylate based resin materials comprise tricyclodecane dimethanol diacrylate, methacrylic acid, epoxy acrylate, tris (2-hydroxyethyl) isocyanurate triacrylate, polybutadiene acrylonitrile dimethacrylate, hydroxypropyl methacrylate, or combinations thereof.

5. The method of claim 1, wherein the peroxide initiators comprise cumene hydroperoxide, t-butylhydroperoxide, p-menthane hydroperoxide, diisopropylbenzene hydroperoxide, pinene hydroperoxide, methyl ethyl ketone peroxide, or combinations thereof.

6. The method of claim 1, wherein the aromatic amine accelerators comprise N,N-diethyl-p-toluidine, N,N-dimethyl-o-toluidine, acetyl phenylhydrazine, N,N-dimethylaniline, N,N-dimethyl-p-toluidine, N,N-dimethyl-p-anisidine, N,N-diethylaniline, N,N-bis-(2-hydroxyethyl)-p-toluidine, or combinations thereof.

7. The method of claim 1, wherein the anaerobically curing matrix resin further comprises an elastomeric toughener, and wherein the elastomeric toughener comprises chlorosulfonated polyethylene.

8. The method of claim 1, wherein the primer further comprises a catalyst, and wherein the catalyst is copper ethylhexanoate.

9. The method of claim 1, wherein the matrix resin consists of a combination of tricyclodecane dimethanol diacrylate, methacrylic acid, epoxy acrylate, tris (2-hydroxyethyl) isocyanurate triacrylate, polybutadiene acrylonitrile dimethacrylate, hydroxypropyl methacrylate, benzoic sulfimide, dimethylaniline, and cumene hydroperoxide.

10. The method of claim 1, wherein the primer consists of a combination of tertiary butyl acetate, hydroxypropyl methacrylate, chlorosulfonated polyethylene, isobornyl methacrylate, hexafunctional aromatic urethane acrylate, methacrylic acid, and copper ethylhexanoate.

* * * * *

UNITED STATES PATENT AND TRADEMARK OFFICE
CERTIFICATE OF CORRECTION

PATENT NO. : 12,037,472 B2
APPLICATION NO. : 17/409185
DATED : July 16, 2024
INVENTOR(S) : Rock Rushing It is certified that error appears in the above-identified patent and that said Letters Patent is hereby corrected as shown below:

In the Specification

1. In Column 4, Line 7, delete "Anaerobic ally" and insert -- Anaerobically --, therefor.

In the Claims

2. In Column 18, Line 6, in Claim 5, delete "p-menthane" and insert -- p-methane --, therefor.

Signed and Sealed this
Third Day of September, 2024

Katherine Kelly Vidal
*Director of the United States Patent and Trademark Office*